US010341930B2

(12) United States Patent
Kim et al.

(10) Patent No.: US 10,341,930 B2
(45) Date of Patent: Jul. 2, 2019

(54) MOBILE AD-HOC ROUTING APPARATUS AND METHOD

(71) Applicant: Electronics and Telecommunications Research Institute, Daejeon (KR)

(72) Inventors: Myung eun Kim, Daejeon (KR); Tae Joon Park, Daejeon (KR); Sun Jin Kim, Daejeon (KR); Jong Hyun Park, Daejeon (KR); Hyo Chan Bang, Daejeon (KR); Myung Nam Bae, Daejeon (KR); Dong Beom Shin, Daejeon (KR); Hoe Sung Yang, Daejeon (KR); Kang Bok Lee, Daejeon (KR); Sang Yeoun Lee, Daejeon (KR); Hye Sun Lee, Daejeon (KR); Jin Chul Choi, Daejeon (KR); Sang Gi Hong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 237 days.

(21) Appl. No.: 15/360,889

(22) Filed: Nov. 23, 2016

(65) Prior Publication Data
US 2017/0150418 A1    May 25, 2017

(30) Foreign Application Priority Data

Nov. 23, 2015  (KR) .................. 10-2015-0164197
Oct. 27, 2016  (KR) .................. 10-2016-0141430

(51) Int. Cl.
*H04L 12/16*    (2006.01)
*H04W 40/20*    (2009.01)
(Continued)

(52) U.S. Cl.
CPC ........... *H04W 40/20* (2013.01); *H04L 45/122* (2013.01); *H04L 45/124* (2013.01);
(Continued)

(58) Field of Classification Search
None
See application file for complete search history.

(56) References Cited

U.S. PATENT DOCUMENTS

2008/0095113 A1    4/2008  Kim et al.
2008/0095163 A1*   4/2008  Chen ................ H04L 45/16
                                                    370/392
(Continued)

FOREIGN PATENT DOCUMENTS

KR    10-2011-0097516 A    8/2011
KR    10-1465138 B1       11/2014
KR    10-1480627 B1        1/2015

*Primary Examiner* — Phirin Sam

(57) ABSTRACT

A mobile ad-hoc routing apparatus includes a first communication module and a second communication module configured to transmit and receive data through a first communication band and a second communication band, respectively, a memory configured to store a program for transmitting and receiving the data, and a processor configured to execute the program stored in the memory, wherein when the program is executed, the processor receives first control information broadcast by one or more neighboring nodes via the first communication module and stores the first control information in the memory, wherein the first control information includes current position and communication status information of the neighboring node, the processor updates information on the neighboring node on the basis of the first control information, generates packet forwarding information which includes information on a node which currently allows packet data to be transmitted based on the updated information on the neighboring node, and stores the generated packet forwarding information in the memory, (Continued)

and the processor determines a subsequent node which allows the packet data to be transmitted to a destination node on the basis of the packet forwarding information and transmits the packet data to the subsequent node via the second communication module.

20 Claims, 7 Drawing Sheets

(51) Int. Cl.
*H04L 12/733* (2013.01)
*H04L 12/721* (2013.01)
*H04W 40/16* (2009.01)
*H04M 15/00* (2006.01)
*H04W 84/18* (2009.01)
*H04W 40/24* (2009.01)

(52) U.S. Cl.
CPC ....... *H04M 15/8044* (2013.01); *H04W 40/16* (2013.01); *H04W 40/24* (2013.01); *H04W 84/18* (2013.01)

(56) References Cited

U.S. PATENT DOCUMENTS

| | | | |
|---|---|---|---|
| 2008/0126403 A1* | 5/2008 | Moon | G06F 17/30575 |
| 2010/0091700 A1* | 4/2010 | Michaels | H04W 48/16 370/328 |
| 2011/0110273 A1* | 5/2011 | Copeland | H04L 1/0015 370/255 |
| 2012/0155397 A1* | 6/2012 | Shaffer | H04W 74/085 370/329 |
| 2013/0279398 A1 | 10/2013 | Cha et al. | |
| 2013/0315099 A1* | 11/2013 | Chen | H04L 45/16 370/254 |
| 2015/0111591 A1* | 4/2015 | Hoffberg | G06Q 10/0631 455/452.1 |
| 2015/0264627 A1* | 9/2015 | Perdomo | H04W 40/12 370/329 |
| 2017/0093687 A1* | 3/2017 | Wu | H04L 45/122 |

\* cited by examiner

MOBILE AD-HOC ROUTING APPARATUS AND METHOD

CROSS-REFERENCE TO RELATED APPLICATION

This application claims priority to and the benefit of Korean Patent Application No. 10-2015-0164197, filed on Nov. 23, 2015 and Korean Patent Application No. 10-2016-0141430, filed on Oct. 27, 2016, the disclosure of which is incorporated herein by reference in its entirety.

BACKGROUND

1. Field of the Invention

The present invention relates to a mobile ad-hoc routing apparatus and method.

2. Discussion of Related Art

Various methods of providing communications in an environment where communication infrastructure is not available, for example, in a military base, disaster area, or an emergency rescue situation, have been studied, and technology of a mobile ad-hoc network (MANET) has been introduced in the same context.

A MANET does not perform communication through established network infrastructure such as a conventional network and is a type of network capable of performing communication functions, such as data transmission and reception, through routing between nodes in the absence of communication infrastructure.

Thus, all communication nodes in a MANET environment perform data transmission and reception as terminal nodes and also perform router functions as intermediate nodes to forward data to a destination.

In order to transmit data in a MANET environment, an ad-hoc network is first established between moving nodes. Then, information on adjacent nodes is collected using a routing protocol, a multi-hop routing path to a destination is determined using the collected information, and data is transmitted.

However, in a routing protocol for a MANET according to a related art, a large amount of control information is generated to acquire information on adjacent nodes because locations of the nodes are continuously changed due to characteristics of the MANET. As a result, a large load is imposed on the network, and hence a problem arises in that it is difficult to smoothly transmit data between the communication nodes.

In addition, a MANET according to a related art is intended for communication in an environment free from obstacles, (e.g., mountains, fields, etc.) such as a military base, a disaster area, or an emergency rescue environment, and as such there are too many limitations in an application to a building environment with a complex structure.

Thus, it is necessary to develop a new type of mobile ad-hoc routing technology which can overcome problems in the related art, such as a problem of generating a large amount of control data in order to identify adjacent nodes in an environment where there is no communication infrastructure, for example, in the case of providing communication between firefighters extinguishing a fire in a complex building, and a problem of low data transmission rate in a harsh environment, such as a complex building, a fire scene, and the like.

Korean Laid-Open Publication No. 10-2006-0068440 (titled "Method for determining routing path in mobile ad hoc network and network apparatus thereof") discloses a method including sorting one or more routing paths through which a data packet can be transmitted to a destination node, selecting, from among the sorted routing paths, a routing path having a smallest sum of weights which are calculated based on a packet transmission rate of each node constituting the routing path, and transmitting the data packet through the selected routing path.

SUMMARY OF THE INVENTION

The purpose of embodiments of the present invention is to provide a mobile ad-hoc routing apparatus and method capable of stably transmitting data, for which a routing path between communication nodes connected in ad-hoc mode is generated and provided using location information and communication status information of the communication nodes in an infra-less environment so that an ad-hoc network between the communication nodes is formed even in a complex structured environment.

However, purposes to be achieved by the present invent are not limited to the above-described purpose, and other purposes may be achieved by the present invention.

In one general aspect, there is provided a mobile ad-hoc routing apparatus including: a first communication module and a second communication module configured to transmit and receive data through a first communication band and a second communication band, respectively; a memory configured to store a program for transmitting and receiving the data; and a processor configured to execute the program stored in the memory, wherein when the program is executed, the processor receives first control information broadcast by one or more neighboring nodes via the first communication module and stores the first control information in the memory, wherein the first control information includes current position and communication status information of the neighboring node, the processor updates information on the neighboring node on the basis of the first control information, generates packet forwarding information which includes information on a node which currently allows packet data to be transmitted based on the updated information on the neighboring node, and stores the generated packet forwarding information in the memory, and the processor determines a subsequent node which allows the packet data to be transmitted to a destination node on the basis of the packet forwarding information and transmits the packet data to the subsequent node via the second communication module.

In another general aspect, there is provided a routing method of a mobile ad-hoc routing apparatus, the routing method including: receiving first control information broadcast by a neighboring node via a first communication module; updating information on the neighboring node on the basis of the first control information; generating packet forwarding information including information on a node which currently allows packet data to be transmitted based on the updated information on the neighboring node; and transmitting packet data via a second communication module on the basis of the packet forwarding information, wherein the first control information includes a current location and communication status information of the neighboring node, and a first communication band of the first communication module has a wider transmission range than that of a second communication band of the second communication module.

In this case, the control information transmitted from a neighboring node will be referred to as "first control information," and the control information transmitted by the node itself will be referred to as "second control information."

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The present invention will be described more fully hereinafter with reference to the accompanying drawings, in which exemplary embodiments of the invention are shown. However, the invention may be embodied in many different forms and is not to be construed as being limited to the embodiments set forth herein. Also, irrelevant details have been omitted from the drawings for increased clarity and conciseness.

Throughout the detailed description, the term "comprise" and its variations, such as "comprises" or "comprising," should be understood as implying the inclusion of stated elements and not as excluding any other elements unless explicitly described to the contrary.

The present invention relates to a mobile ad-hoc routing apparatus 100 and method.

Hereinafter, the mobile ad-hoc routing apparatus 100 according to one embodiment of the present invention will be described with reference to FIGS. 1 to 3.

Figure 1:
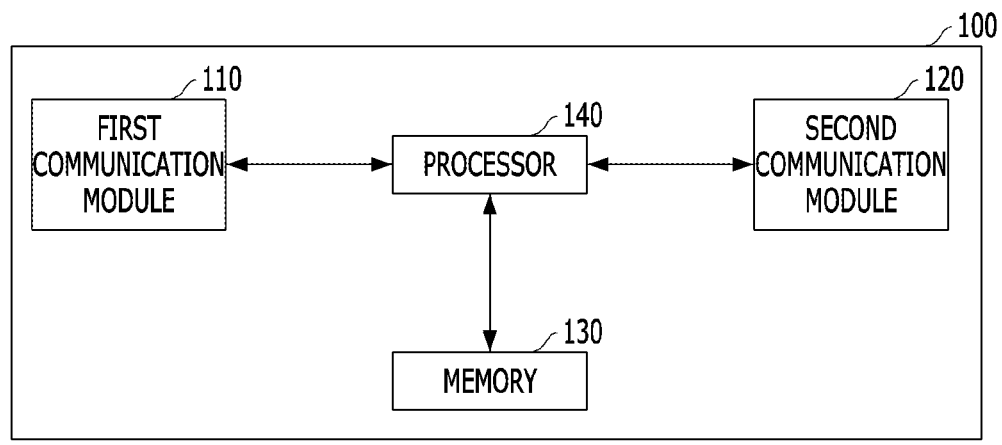
FIG. 1 is a block diagram illustrating a mobile ad-hoc routing apparatus according to one embodiment of the present invention.

FIG. 1 is a block diagram illustrating the mobile ad-hoc routing apparatus 100 according to one embodiment of the present invention.

The mobile ad-hoc routing apparatus 100 in accordance with one embodiment of the present invention includes a first communication module 110, a second communication module 120, a memory 130, and a processor 140.

The first communication module 110 and the second communication module 120 transmit and receive data over a first communication band a and a second communication band b, respectively. The communication bands are illustrated in FIG. 2.

Figure 2:
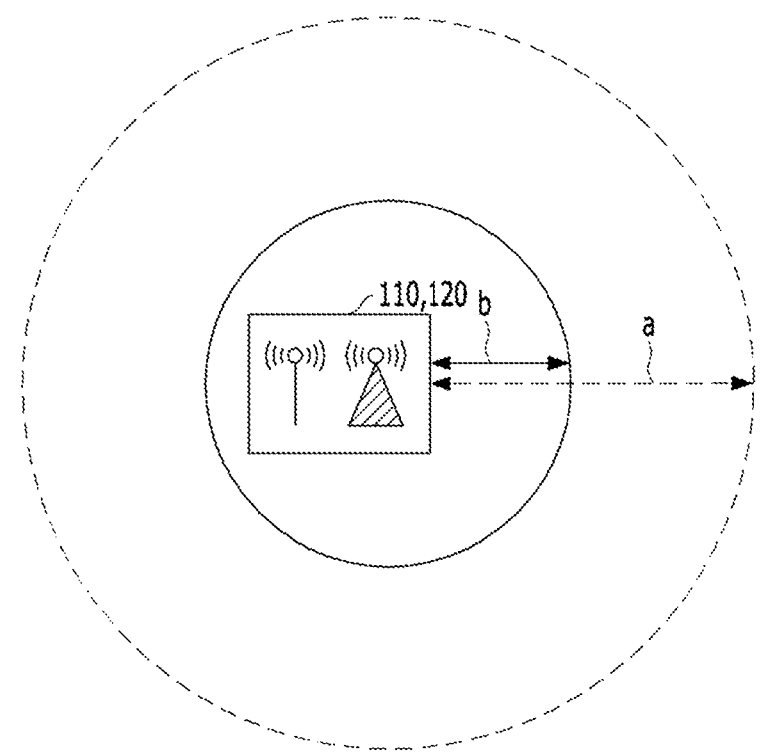
FIG. 2 is a diagram for describing a first communication band and a second communication band.

FIG. 2 is a diagram for describing the first communication band a and the second communication band b.

The embodiment of the present invention is characterized in that heterogeneous communication channels are provided by separating a channel for transmitting control information from a channel for transmitting packet data.

In this case, the first communication module 110 may be a sub-GHz module, and the second communication module 120 may be a Wi-Fi module. In addition, the first communication band a may have a wider transmission range than the second communication band b.

For example, since a transmission range of the sub-GHz module reaches about 50 m and a transmission range of the Wi-Fi module reaches about 10 m, the first communication band a has a wider transmission range than the second communication band b. Thus, even when communication nodes leaves the second communication band b, the communication nodes may receive location information and communication status information from each other as long as all the communication nodes are located within the first communication band a.

The first communication module 110 may receive first control information including location information and communication status information from a neighboring node or broadcast second control information including location information and communication status information thereof. Hereinafter, the control information transmitted from a neighboring node will be referred to as "first control information," and the control information transmitted by the node itself will be referred to as "second control information."

The second communication module 120 may receive packet data from a neighboring node or transmit packet data to the neighboring node.

Referring back to FIG. 1, the memory 130 stores a program for transmitting and receiving data through the first and second communication modules 110 and 120. In this case, the memory 130 is collectively referred to as a volatile storage device and a non-volatile storage device which retains stored information even when power is not supplied thereto.

For example, the memory 130 may include a NAND flash memory, such as a compact flash (CF) card, a secure digital (SD) card, a memory stick, a solid-state drive (SSD), a micro SD card, or the like.

The processor 140 executes the program stored in the memory 130.

The processor 140 receives the first control information broadcast by one or more neighboring nodes via the first communication module 110 when the program is executed and stores the received first control information in the memory 130.

At this point, the memory 130 may store information which includes at least one or more of the following items: identification (ID), a media access control (MAC) address, and location coordinates of a neighboring node that corresponds to the first control information, a communication cost between the neighboring node positioned within a 1-hop distance, and a sequence number.

For example, the ID of the neighboring node may be "1," the MAC address of the neighboring node may be "00-00-0c-07-ac-cb", the location coordinates of the neighboring node may be (10, 11, 12), and the cost for communication with neighboring nodes positioned within a 1-hop distance may be represented as a pair of node IDs of a node positioned within the 1-hop distance and the communication cost, for example, (3, 50).

The processor 140 may perform the following procedures in order to calculate the communication cost included in the neighboring node information which is stored in the memory 130.

The processor 140 may transmit a dummy message to a neighboring node positioned within a 1-hop distance via the second communication module 120 at predetermined intervals on the basis of neighboring node information, that is, location coordinates, in order to calculate a cost for communication with neighboring nodes positioned within the 1-hop distance.

To this end, the processor 140 may determine whether the neighboring node positioned within the 1-hop distance is located within the second communication band b and, when it is determined that the neighboring node is located within the second communication band b, transmit a dummy message to the pertinent neighboring node.

The neighboring node which has received the dummy message may generate a signal-to-noise ratio (SNR) and calculate the communication cost in consideration of a bit error rate (BER) and location information calculated based on the SNR.

In this case, when the processor 140 has been receiving packet data from one or more neighboring nodes via the second communication module 120, the processor 140 may calculate a communication cost thereof based on the received packet data, wherein the communication cost is based on a BER and location information of the neighboring node. That is, the processor 140 may directly calculate the communication cost of the neighboring node, and hence the processor 140 may not transmit dummy data to the neighboring node in this case.

When communication costs of the neighboring nodes are calculated as described above, the processor 140 may store the calculated communication costs of the neighboring nodes in the memory 130.

When the processor 140 receives first control information, the processor 140 determines whether the first control information is broadcast by a new neighboring node. When the first control information is broadcast by the new neighboring node, the processor 140 may store information on the new neighboring node corresponding to the first control information in the memory 130.

Then, the processor 140 updates the information on the neighboring node on the basis of the first control information stored in the memory 130. In this case, the processor 140 may update the information on the neighboring node by identifying neighboring nodes positioned within a 1-hop distance and calculating a cost for communication with the identified neighboring nodes.

In addition, when a sequence number in the received first control information has been updated in a case in which the first control information is not broadcast by a new node but corresponds to previously stored information on a neighboring node, the processor 140 may update the information on the neighboring node which corresponds to the first control information.

When the information on the neighboring node is updated, the processor 140 generates packet forwarding information based on the updated information and stores the generated information in the memory 130, wherein the packet forwarding information includes information on a node currently capable of transmitting packet data.

More specifically, the processor 140 may check whether the information on the neighboring node has been updated and calculate a minimum cost path to reach each node with a minimum communication cost on the basis of a Dijkstra algorithm each time the information is updated. In addition, on the basis of the calculated path cost, the processor 140 may generate packet forwarding information which includes information on nodes positioned within a 1-hop distance and a 2-hop distance that are currently capable of transmitting packet data.

The packet forwarding information may include at least one of an address of a destination node, addresses of the nodes positioned within a 1-hop distance and a 2-hop distance, and a communication cost of the node positioned within a 1-hop distance.

For example, when the address of the destination node is "00-00-0c-07-ac-cb," the address of a node positioned within a 1-hop distance is "00-00-0a-08-ac-cd," a communication cost of the node positioned within the 1-hop distance is "40," and the address of a node positioned within a 2-hop distance is "00-00-0d-01-bc-ab," the packet forwarding information may be stored in the form of "00-00-0c-07-ac-cb, 00-00-0a-08-ac-cd, 40, and 00-00-0d-01-bc-ab."

When the packet forwarding information is generated, the processor 140 determines a subsequent node capable of transmitting packet data to the destination node on the basis of the packet forwarding information and transmits the packet data via the second communication module 120.

That is, when the processor 140 has received the packet data from the neighboring node via the second communication module 120, the processor 140 checks whether the address of the destination node of the received packet data corresponds to the packet forwarding information. When the address corresponds to the packet forwarding information, the processor 140 may transmit the packet data to the address of the destination node.

Conversely, when the address of the destination node does not correspond to the packet forwarding information, that is, when the shortest path is disconnected due to the movement of a node, the processor 140 determines whether there are nodes positioned within a 2-hop distance among the neighboring nodes located within the second communication band b. When the nodes positioned within the 2-hop distance are present, the processor 140 may select the node having a minimum cost path to reach the destination node from among the nodes positioned within the 2-hop distance and transmit the packet data.

Conversely, when there are no node positioned within the 2-hop distance, the processor 140 may select the node having a minimum cost path to the destination node from among the nodes positioned within the 1-hop distance and transmit the packet data.

In addition, the processor 140 may broadcast the second control information containing current location and communication status information thereof to one or more neighboring nodes via the first communication module 110 at predetermined intervals.

In this case, the processor 140 may obtain the second control information from the memory 130 and broadcast the second control information via the first communication module 110, wherein the second control information contains both location information including location information coordinates (x, y, and z) and communication status information including a cost for communication with the neighboring nodes.

When broadcasting the second control information, the processor 140 may increase a sequence number at each interval and transmit the sequence number together with the second control information so that the neighboring nodes do not receive duplicate values.

The mobile ad-hoc routing apparatus 100 in accordance with one embodiment of the present invention may be operated by functional blocks illustrated in FIG. 3 and will be described with reference to FIG. 3.

Figure 3:
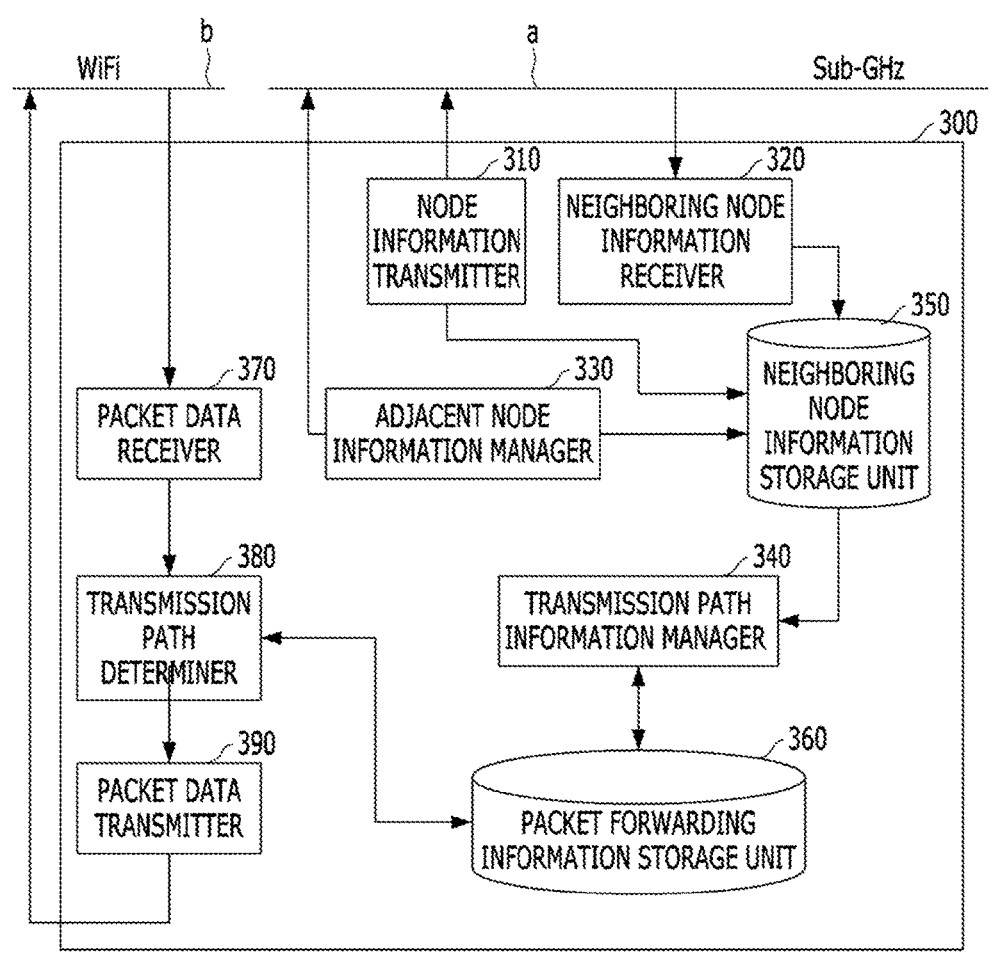
FIG. 3 is a block diagram for describing functions of a mobile ad-hoc routing apparatus according to one embodiment of the present invention.

FIG. 3 is a block diagram for describing functions of a mobile ad-hoc routing apparatus 300 according to one embodiment of the present invention.

The mobile ad-hoc routing apparatus 300 in accordance with one embodiment of the present invention includes a node information transmitter 310, a neighboring node information receiver 320, an adjacent node information manager 330, a transmission path information manager 340, a neighboring node information storage unit 350, a packet forwarding information storage unit 360, a packet data receiver 370, a transmission path determiner 380, and a packet data transmitter 390.

The node information transmitter 310 broadcasts second control information which includes location information and communication status information of the node itself at predetermined intervals, and the neighboring node information receiver 320 receives first control information broadcast by a neighboring node. In this case, the node information transmitter 310 and the neighboring node information receiver 320 transmit and receive the second and first control information using the first communication band a.

Information on the neighboring node that corresponds to the received first control information is stored in the neighboring node information storage unit 350.

The adjacent node information manager 330 updates information on neighboring nodes by identifying neighboring nodes positioned within a 1-hop distance and calculating costs for communication with the identified neighboring nodes.

The transmission path information manager 340 generates packet forwarding information including information on a node currently capable of packet data transmission on the basis of the updated information on neighboring nodes and stores the generated information in the packet forwarding information storage unit 360.

The packet data receiver 370 receives packet data from a neighboring node, and the packet data transmitter 390 transmits packet data to the neighboring node. In this case, the packet data receiver 370 and the packet data transmitter 390 may receive and transmit packet data using the second communication band b.

More specifically, when the packet data receiver 370 receives the packet data, the transmission path determiner 380 to which the packet data is forwarded may determine a subsequent node that is capable of transmitting the packet data to a destination node by referring to the packet forwarding information, and may transmit the packet data to the subsequent node through the packet data transmitter 390.

The node information transmitter 310 and the neighboring node information receiver 320, which are illustrated in FIG. 3, may correspond to the first communication module 110 of FIG. 1, the packet receiver 370 and the packet transmitter 390 may correspond to the second communication module 120, and the other functional blocks of FIG. 3 may correspond to the processor 140 of FIG. 1.

As a reference, components according to illustrative embodiments in FIGS. 1 to 3 may be implemented in the form of software or hardware, such as a field programmable gate array (FPGA) or an application specific integrated circuit (ASIC), which performs predetermined tasks.

However, "components" may not be limited to software or hardware, and each component may be formed to reside on an addressable storage medium and formed to replay one or more processors.

Thus, the components may include, by way of example, components, such as software components, object-oriented software components, class components, and task components, processes, functions, attributes, procedures, subroutines, segments of program code, drivers, firmware, microcode, circuitry, data, databases, data structures, tables, arrays, and parameters.

The components and functions provided in the components may be combined as fewer components or may be further separated into additional components.

Hereinafter, a routing method of the mobile ad-hoc routing apparatus 100 in accordance with one embodiment of the present invention will be described with reference to FIGS. 4 to 8.

Figure 4:
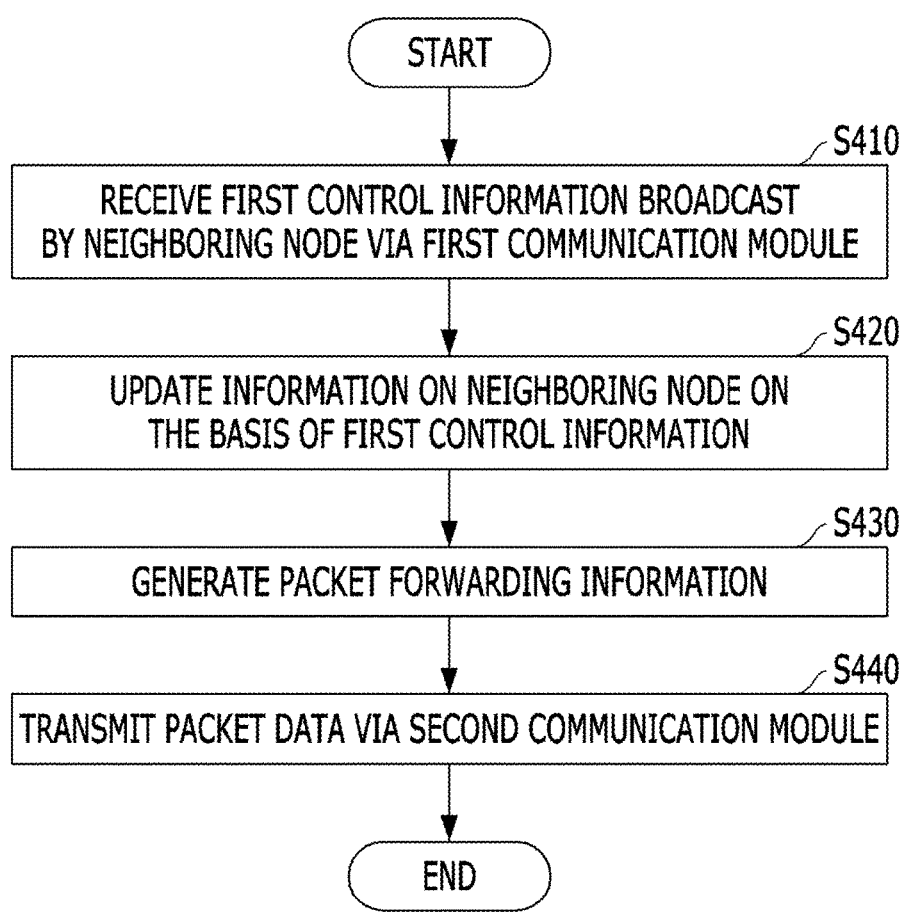
FIG. 4 is a flowchart illustrating a routing method according to one embodiment of the present invention.
Figure 5:
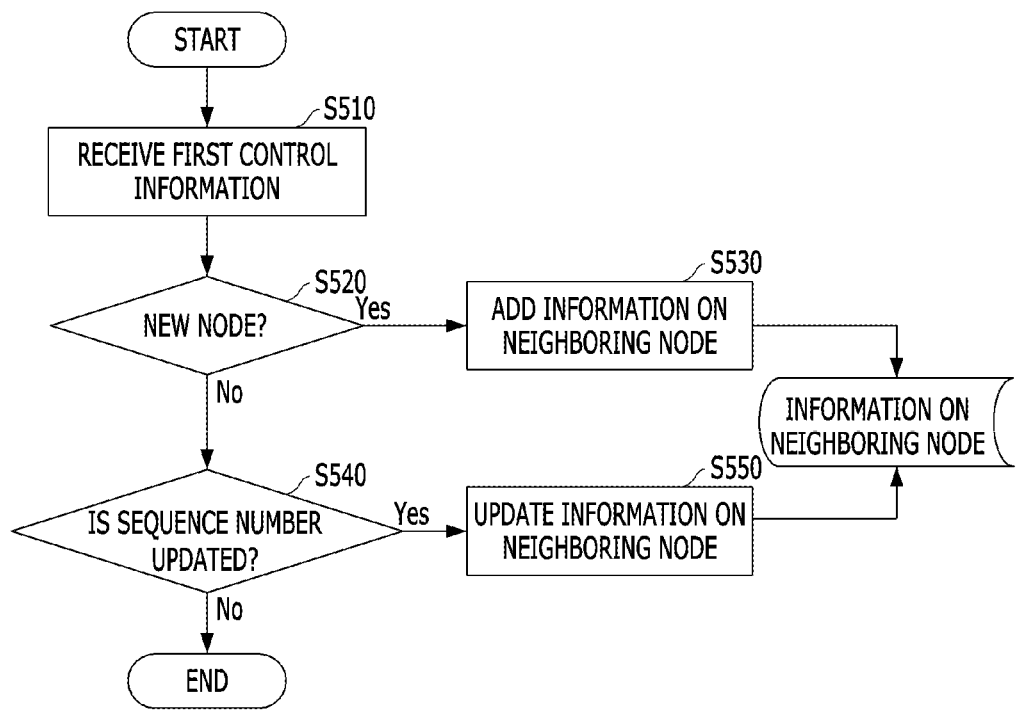
FIG. 5 is a flowchart illustrating a method of storing information on a neighboring node.
Figure 6:
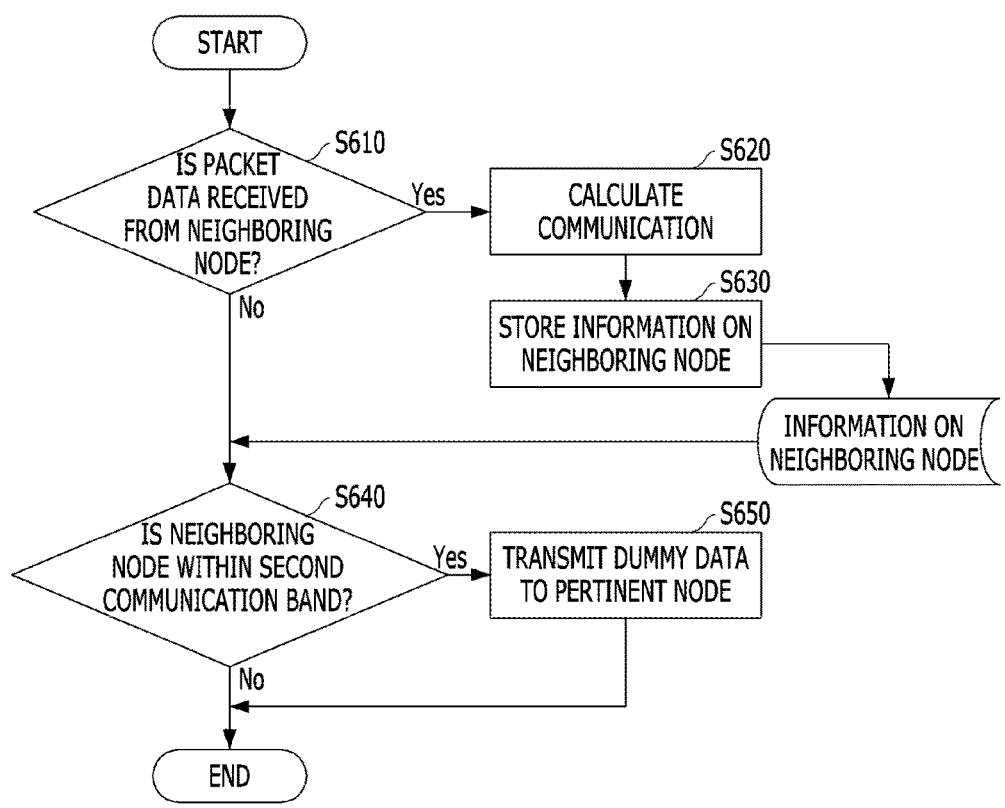
FIG. 6 is a flowchart illustrating a method of calculating a communication cost of a neighboring node.
Figure 7:
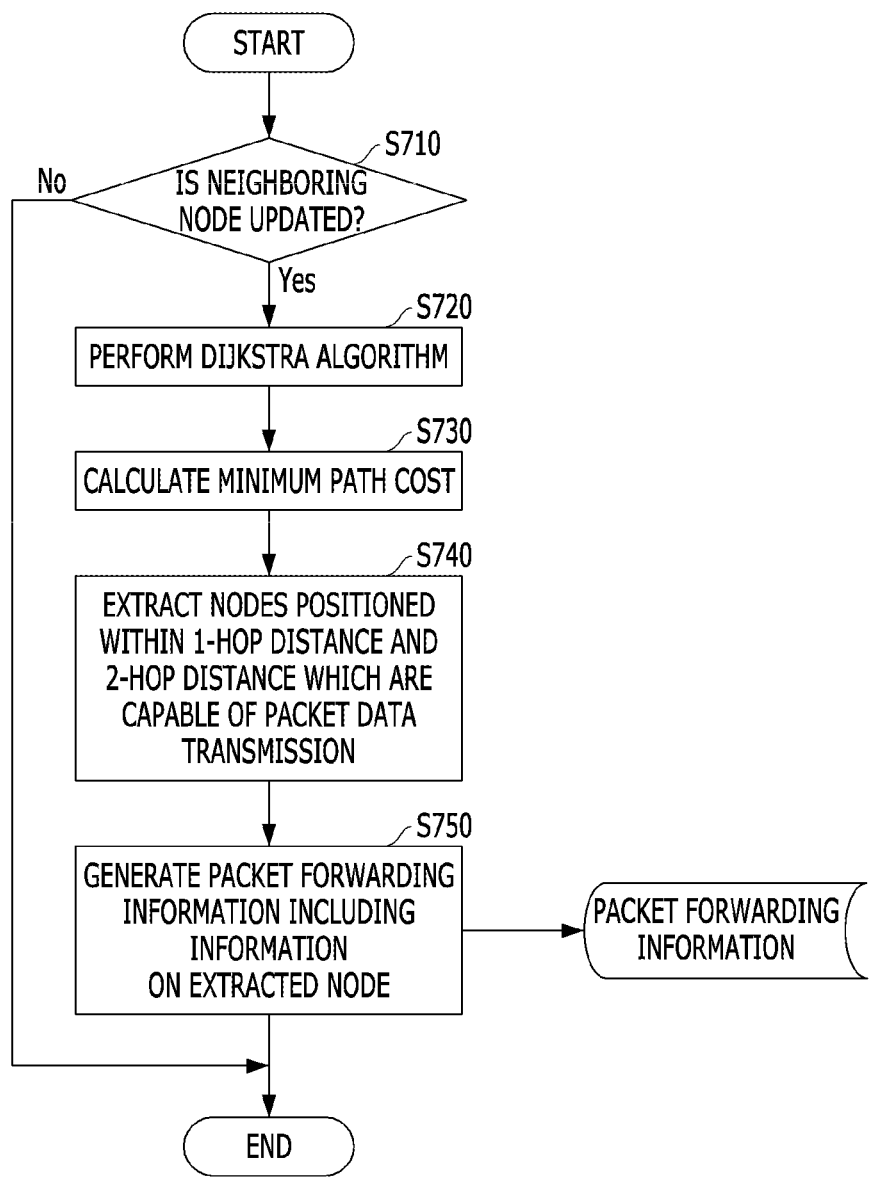
FIG. 7 is a flowchart illustrating a method of calculating packet forwarding information.
Figure 8:
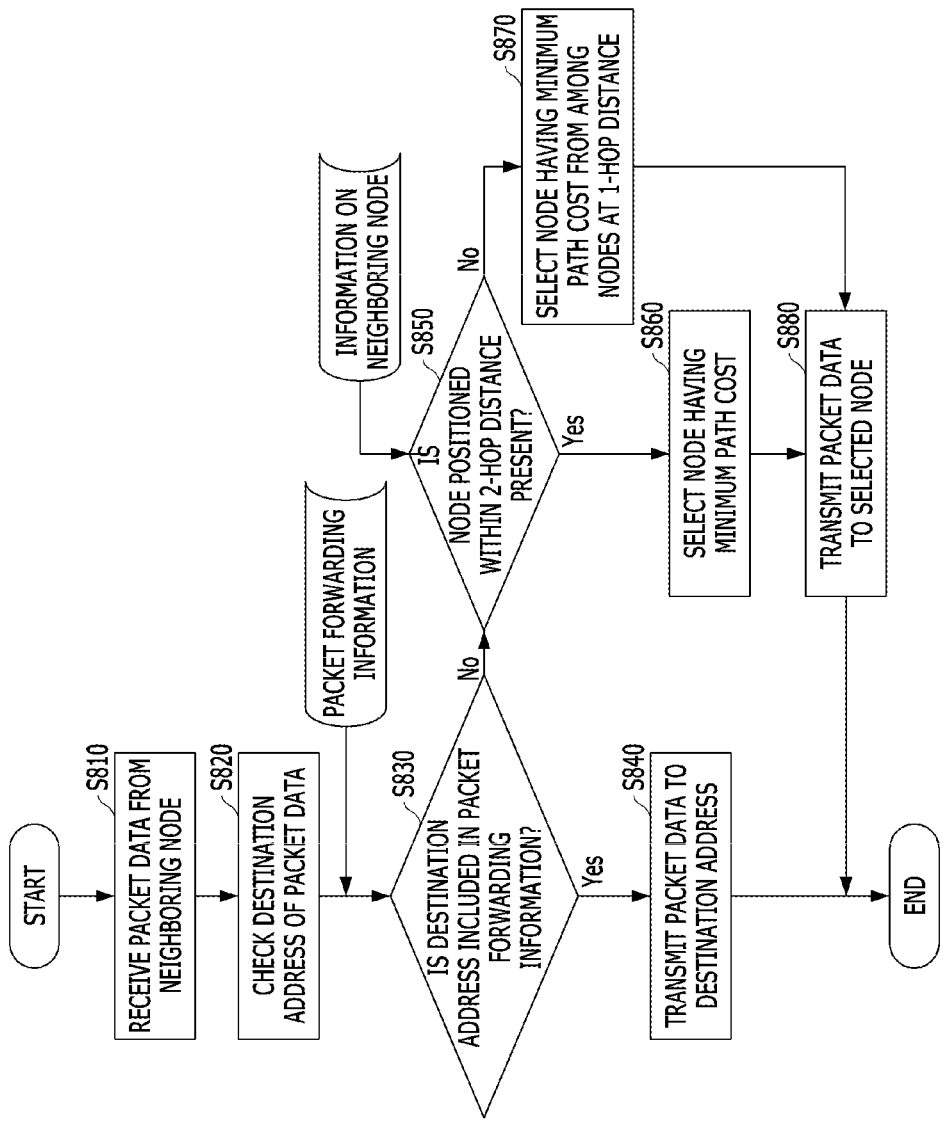
FIG. 8 is a flowchart illustrating a method of transmitting packet data.

FIG. 4 is a flowchart illustrating a routing method according to one embodiment of the present invention. FIG. 5 is a flowchart illustrating a method of storing information on a neighboring node. FIG. 6 is a flowchart illustrating a method of calculating a communication cost of a neighboring node. FIG. 7 is a flowchart illustrating a method of calculating packet forwarding information. FIG. 8 is a flowchart illustrating a method of transmitting packet data.

In the routing method in accordance with one embodiment of the present invention, when first control information broadcast by a neighboring node is received via the first communication module 110 (S410), information on the neighboring node is updated based on the received first control information (S420). In this case, the first control information includes current location and communication status information of the neighboring node.

In addition, according to one embodiment of the present invention, a first communication band a of the first communication module 110 has a wider transmission range than a second communication band b of the second communication module 120.

When the first control information is received as described above, the information on the neighboring node may be stored according to the operations illustrated in FIG. 5.

More specifically, when first control information is received (S510), whether the received first control information is broadcast by a new neighboring node is determined (S520).

When it is determined that the new neighboring node broadcasts the first control information, information on the neighboring node is added to the memory 130 (S530).

Conversely, when the received first control information corresponds to previously stored information on a neighboring node, whether a sequence number of the received first control information has been updated is determined (S540). Then, when it is determined that the sequence number of the first control information has been updated, information on the neighboring node that corresponds to the first control information is updated (S550).

According to one embodiment of the present invention, operations illustrated in FIG. 6 may be performed in order to calculate a communication cost of a neighboring node.

Whether packet data has been received from a neighboring node is determined, and when packet data has been received from one or more neighboring nodes via the second communication module 120 (S610), a communication cost based on a BER and location information of each of the neighboring nodes may be calculated based on the received packet data (S620). The calculated communication cost is included in information on the neighboring node and then stored in a neighboring node storage unit (S630).

In this case, it is not necessary to transmit dummy data to the neighboring node via the second communication module 120.

Conversely, when no packet data has been received from a neighboring node (S610), whether a neighboring node positioned within a 1-hop distance is located within the second communication band b is determined (S640).

When the determination result shows that the neighboring node is located within the second communication band b, dummy data is transmitted to the neighboring node located within the second communication band b at predetermined intervals (S650). The neighboring node which has received the dummy data may calculate a communication cost by taking into account a BER and location information calculated based on an SNR.

Thereafter, packet forwarding information which includes information on a node currently capable of packet data transmission is generated based on information on the neighboring node (S430). The packet forwarding information may be calculated according to the operations as illustrated in FIG. 7.

First, it is checked whether a neighboring node is updated (S710), a Dijkstra algorithm is performed each time the neighboring node is updated (S720), and a minimum cost path to reach each neighboring node is calculated (S730).

Then, nodes positioned within a 1-hop distance and a 2-hop distance which are currently capable of packet data transmission are extracted based on the calculated minimum cost path (S740), and packet forwarding information including information on the extracted nodes is generated (S750). The generated packet forwarding information may be stored in a packet forwarding information storage unit.

Then, packet data is transmitted via the second communication module 120 on the basis of the generated packet forwarding information (S440). In this case, according to one embodiment of the present invention, the packet data may be transmitted using the packet forwarding information according to the operations illustrated in FIG. 8.

When packet data is received from a neighboring node via the second communication module 120 (S810), whether an address of a destination node of the packet data corresponds to packet forwarding information is checked (S820).

When the determination result shows that the address of the destination node is contained in the packet forwarding information (S830), the packet data may be transmitted to the address of the destination node (S840).

Conversely, when the packet forwarding information does not contain the address of the destination node (S830), whether there are nodes positioned within a 2-hop distance among nodes located within the second communication band b is determined (S850).

When the nodes positioned within the 2-hop distance are present, the node having a minimum cost path to reach the destination node is selected from among the nodes positioned within the 2-hop distance (S860), and the packet data may be transmitted to the selected node (S880).

Conversely, when there are no node positioned within the 2-hop distance, the node having the minimum cost path to reach the destination node is selected from among nodes positioned within a 1-hop distance (S870), and the packet data may be transmitted to the selected node (S880).

In the foregoing description, operations S410 to S880 may be divided into additional operations or combined as fewer operations according to an implementation example of the present invention. In addition, some operations may be omitted if necessary, and an order of the operations may be changed. Further, although not reiterated, the description regarding the mobile ad-hoc routing apparatus 100 described with reference to FIGS. 1 to 3 is applied to the routing method illustrated in FIGS. 4 to 8.

According to one of the above embodiments of the present invention, by using two heterogeneous transmission channels, i.e., a sub-GHz channel and a Wi-Fi channel, location information and communication status information of an adjacent node are transmitted over the sub-GHz channel and user data is transmitted over the Wi-Fi channel so that problems of an existing mobile ad-hoc network may be solved.

In related arts, a message is frequently transmitted in order to find an adjacent communicable node due to movement of a node, and hence a load on a network is increased, thereby causing a problem in transmission of user data.

In addition, in the related arts, when a multi-hop routing path is established, a shortest distance is selected as an optimal path along which to transmit user data in consideration of an environment where no obstacles exist.

Accordingly, in the related arts, in the case of a building with a complex structure in which there are obstacles, radio signals are weakened and communication performance is degraded so that a case in which the shortest distance cannot be regarded as the optimal path frequently occurs.

However, according to one embodiment of the present invention, an optimal path is selected using communication status information of each communication node so that the mobile ad-hoc routing apparatus and method can be applied even in a building with a complex structure.

Thus, one embodiment of the present invention can provide communication infrastructure which enables a stable transmission of control information and user data mutually within a poor environment where no communication infrastructure exists, for example, in an emergency rescue situation and a fire suppression situation in a complex building on fire.

The routing method of the mobile ad-hoc routing apparatus 100 in accordance with one embodiment of the present invention may be embodied as computer program stored in a medium executed by a computer or a recording medium including instruction codes executable by a computer. A computer readable medium may be any usable medium which may be accessed by a computer and include all volatile/non-volatile and removable/non-removable media. Further, the computer readable medium may include all computer storage and communication media. The computer storage medium includes all volatile/non-volatile and removable/non-removable media embodied by any method or technology for storing information such as computer readable instruction code, a data structure, a program module, or other pieces of data. The communication medium typically includes computer readable instruction code, a data structure, a program module, or other pieces of data of a modulated data signal such as a carrier wave, or other transmission mechanisms, and includes any information transmission medium.

According to one embodiment of the present invention, by using heterogeneous transmission channels, location information and communication status information of an adjacent node are transmitted through a first communication band and packet data, which is user data, is transmitted through a second communication band so that a load on a network can be reduced.

In addition, an optimal path is selected using communication status information of each communication node so that it is possible to apply the mobile ad-hoc routing apparatus and method even to an environment with a complex structure.

Although the method and apparatus of the invention have been described in connection with specific embodiments of the invention, some or all of the components or operations thereof may be realized using a computer system that has general-use hardware architecture.

It should be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A mobile ad-hoc routing apparatus comprising:
 a first communication module configured to transmit and receive data through a first communication band;
 a second communication module configured to transmit and receive data through a second communication band different from the first communication band;
 a memory configured to store a program; and
 a processor configured to execute the program stored in the memory,
 wherein when the program is executed:
  the processor receives first control information broadcast by one or more neighboring nodes via the first communication band using the first communication module and stores the first control information in the memory, wherein the first control information includes current position and communication status information of the neighboring node,
  the processor updates information on the neighboring node on the basis of the first control information, generates packet forwarding information which includes information on a node which currently allows packet data to be transmitted based on the updated information on the neighboring node, and stores the generated packet forwarding information in the memory, and
  the processor determines a subsequent node which allows the packet data to be transmitted to a destination node on the basis of the packet forwarding information and transmits the packet data to the subsequent node via the second communication band using the second communication module.

2. The apparatus of claim 1, wherein the first communication module is a sub-GHz module, and the second communication module is a Wi-Fi module.

3. The apparatus of claim 2, wherein the first communication band has a wider transmission range than the second communication band.

4. The apparatus of claim 1, wherein the memory stores information which includes one or more of node identification (ID), a media access control (MAC) address, and location coordinates of a neighboring node that corresponds to the first control information, a communication cost between a neighboring node positioned within a 1-hop distance, and a sequence number.

5. The apparatus of claim 1, wherein the processor updates the information on the neighboring node by identifying neighboring nodes positioned within a 1-hop distance and calculating costs for communication with the identified neighboring nodes.

6. The apparatus of claim 5, wherein:
 the processor determines whether the received first control information is broadcast by a new neighboring node;
 when it is determined that the first control information is broadcast by the new neighboring node, stores information on the new neighboring node in the memory; and
 when it is determined that the first control information corresponds to previously stored information on a neighboring node and when a sequence number of the received first control information is updated, updates the information on the neighboring node which corresponds to the first control information.

7. The apparatus of claim 5, wherein:
 the processor transmits a dummy message to the neighboring node positioned within the 1-hop distance via the second communication band at predetermined intervals on the basis of the information on the neighboring information; and
 the neighboring node which receives the dummy message calculates a communication cost in consideration of a bit error rate (BER) and location information calculated based on a signal-to-noise (SNR) ratio.

8. The apparatus of claim 7, wherein when it is determined that the neighboring node positioned within the 1-hop distance is positioned within the second communication band, the processor transmits a dummy message to the neighboring node positioned within the second communication band.

9. The apparatus of claim 7, wherein when the processor receives the packet data from one or more of the neighboring nodes via the second communication band, the processor calculates communication costs based on a BER and location information of the neighboring nodes on the basis of the received packet data, wherein the processor does not transmit the dummy message to the neighboring nodes which have transmitted the packet data.

10. The apparatus of claim 5, wherein the processor calculates a minimum cost path to reach each of the neighboring nodes each time the information on the neighboring node is updated and generates the packet forwarding information on the basis of the calculated minimum cost path, wherein the packet forwarding information includes information on nodes positioned within the 1-hop distance and a 2-hop distance which currently allows packet data to be transmitted.

11. The apparatus of claim 10, wherein the packet forwarding information includes one or more of an address of a destination node, an addresses of the nodes positioned within the 1-hop distance and the 2-hop distance, a communication cost of the node positioned within the 1-hop distance.

12. The apparatus of claim 10, wherein when the processor receives packet data from the neighboring node via the second communication band, the processor checks whether an address of a destination node of the received packet data corresponds to the packet forwarding information and, when the address corresponds to the packet forwarding information, transmits the packet data to the address of the destination node.

13. The apparatus of claim 12, wherein when the address of the destination does not correspond to the packet forwarding information, the processor determines whether there are nodes positioned within the 2-hop distance among neighboring nodes located within the second communication band and, when the nodes positioned within the 2-hop distance are present, selects the node having a minimum cost path to the destination node from among the nodes positioned within 2-hop distance and transmits the packet data.

14. The apparatus of claim 13, wherein when there are no node positioned within the 2-hop distance, the processor selects the node having a minimum cost path to the destination node from among the nodes positioned within the 1-hop distance and transmits the packet data.

15. The apparatus of claim 1, wherein the processor broadcasts second control information including current location and communication status information thereof to one or more of the neighboring nodes via the first communication band at predetermined intervals.

16. The apparatus of claim 15, wherein the processor obtains the second control information from the memory and broadcasts the second control information via the first communication band, wherein the second control information contains both location information including location information coordinates and communication status information including costs for communication with neighboring nodes positioned within a 1-hop distance.

17. The apparatus of claim 16, wherein the processor increases a sequence number of the second control information at each interval and broadcasts the second information.

18. A routing method of a mobile ad-hoc routing apparatus, the routing method comprising:
receiving first control information broadcast by a neighboring node via a first communication band using a first communication module;
updating information on the neighboring node on the basis of the first control information;
generating packet forwarding information including information on a node which currently allows packet data to be transmitted based on the updated information on the neighboring node; and
transmitting packet data via a second communication band using a second communication module on the basis of the packet forwarding information, the second communication band being different than the first communication band,
wherein the first control information includes a current location and communication status information of the neighboring node, and
the first communication band has a wider transmission range than that of the second communication band.

19. The method of claim 18, wherein the updating of the information on the neighboring node comprises:
identifying neighboring nodes positioned within a 1-hop distance; and
calculating costs for communication with the identified neighboring nodes.

20. The method of claim 19, wherein the generating of the packet forwarding information comprises:
calculating a minimum cost path to reach each of the neighboring nodes each time the information on the neighboring node is updated; and
generating the packet forwarding information on the basis of the calculated minimum cost path wherein the packet forwarding information includes information on nodes positioned within the 1-hop distance and a 2-hop distance which currently allows packet data to be transmitted.

* * * * *